Patented Mar. 24, 1942

2,277,064

UNITED STATES PATENT OFFICE 2,277,064

FLUX

Jerome Milton Bialosky and Menahem Merlub-Sobel, Cleveland Heights, Ohio, assignors, by mesne assignments, to William L. Ulmer, Cleveland, Ohio No Drawing. Continuation of application Serial No. 228,398, September 3, 1938. This application May 15, 1940, Serial No. 335,406

13 Claims. (Cl. 148—23)

This invention relates to a novel and improved process for the joining of metals, and, in particular, represents an improvement in fluxing agents for welding, brazing, and similar joining of metals by application of localized heat.

In the joining of metal edges by the technique of welding, there is a melting of the metal itself along the joining edge; this fused metal, supplemented by the metal added in the form of welding rod, thereby forms the weld zone. It is self-evident that, under such limitations, the welding rod and the metal joined are best held relatively similar chemically and metallurgically. In the technique of brazing and soldering, on the other hand, the metal base being joined does not reach a fused, nor even a plastic stage; it remains in the solid state even along the line of joining. Only the metal used for the brazing or soldering itself reaches the state of fusion.

In both welding, with its fusion of the base metal, and in brazing and soldering, where such fusion does not take place, there are at all times the physical and chemical problems inherent in the contacting of one hot metal surface with another, with at least one of these metal surfaces being in liquid form. It is obvious that the liquid metal or metals must be easily-fluid and free-flowing, and that interfering films of oxides and other impurities must not be permitted to create any barrier against direct metal-to-metal contact. Paraphrased, the problems are those of surface tension and wetting, and of protection from oxides which prevent proper wetting. These problems have long been recognized, both practically and theoretically, and, in effort at solution, they have led to the creation of fluxes, and, broadly, the whole art and science of fluxing.

In great part, the effect of fluxes, at least in the past, have been to act chemically as solvent for the oxides and similar heat-reaction compounds which form on practically all metals during fusion. These oxides interfere, both mechanically and by surface tension factors, with the wetting of the base metal, either solid or fused, by the molten welding or brazing metal.

Historically, such fluxes have usually been solid materials, or solutions which, on heating, leave solid residues. The most common fluxing base, throughout the history of the fluxing art, has been boron, usually in the form of its oxide, boric oxide, or as some salt, such as common borax (sodium tetraborate). The utility of such boron compounds becomes readily understandable when viewed in the light of the known fusibility of most metal oxides when contacted with fused boric oxide or fused alkali borates. Indeed, a whole body of specific tests have been evolved in analytical chemistry, based upon this characteristic of these oxygen compounds of boron.

There are many obvious drawbacks to solid fluxes of the type discussed; such drawbacks have been recognized for many years by those skilled in the art. For one thing, the exact quantitative relationship between metal and flux is difficult to establish, and even when once theoretically established, is quite difficult to maintain with any degree of constancy. The tendency of many powdered solid fluxes to blow away under the gas pressure of the welding or brazing torch has added to this difficulty, and has brought the even greater hazard of losing all flux right in the areas of its greatest urgency. A third variable is the quantity of gas—or heat—delivered per unit of welding area; it has been utterly impossible to create any permanent adjustment between flux and the total gas, or heat, delivered to the welding zone.

A relatively recent effort at eliminating these basic drawbacks has taken the form of an attack on the physical nature of the flux. By substituting a liquid, readily-vaporizable organic boron compound, direct control of the heat-flux ratio has been obtained, the flux being carried, by vapor phase entrainment, to the welding zone, together with the heating gas. Description of such technique, in its simplest form, was given in the Journal of the American Welding Society, on page 20 of its April 1929 issue, in connection with the welding of nickel and Monel metal. In French Patent 814,136, of June 17, 1937, this general procedure has been elaborated considerably, with inclusion not only of boron compounds, such as the alkyl borates, but also involving the addition of a volatile alkyl silicate as well. In a co-pending application, Serial No. 220,560, filed July 21, 1938, we have shown, further, that the objectionable differential volatilization of methyl borate-methyl alcohol mixtures, when mixed in proportions practical for welding and brazing, can be eliminated by dilution with certain types of physically and chemically compatible liquids.

This volatile borate type of flux operates by virtue of combustion of the alkyl borate in the torch flame, to form boric oxide. Such boric oxide, depositing on the work through the impinging of the flame, acts to flux all oxides exactly as would boric oxide placed there in solid form, or deposited by any other method. Thus, though the alkyl borate itself must undergo chemical change by oxidation to boric oxide in order to function at all, the actual fluxing values lie resident in boric oxide; there is no differentiation, chemically, from the long-accepted fluxing technique involving the use of boric oxide in solid form.

For many uses, the volatile alkyl borate procedure, particularly when operated within the limitation described in our aforesaid co-pending application, functions satisfactorily. But there are a number of welding and brazing applications, however, where the vaporizable borates are not adequate. Such failure is directly attributable to the basic, chemical inadequacy of the boric oxide formed by the operation of the flux. An outstanding example is the welding of stainless steel; for stainless steel, the organic borate technique is quite unsatisfactory. For many silver solders, too, it has not proven adequate; the same difficulty has evinced itself with many metals and combinations in both welding and brazing.

We have found, in our invention, that many of these failures are eliminated when a fundamentally different type of volatile fluxing agent, of novel chemical nature, is used. If, exactly as with the borate, gas to be used in the torch is first passed through a liquid, easily vaporizable, halogen compound such as, for example, amyl chloride, the gas entrains such halide, and the flame achieves fluxing properties. While we do not wish to limit ourselves by the following theoretical explanation, it is our belief that, in the operation of the torch, chemical destruction of the compound takes place, and that, among other products of the combustion, free chlorine and/or hydrochloric acid will be found. Such chlorine and/or hydrochloric acid, when impinging on the heated surface to be welded, may react with the oxides to form chlorides, or may react with the free metal to form chlorides; these chlorides would appear to have solvent action on any oxides present, or may merely have surface-chemical effects in lowering surface tension. Whether this is the correct, and adequate, explanation, we cannot be certain, and we do not wish to be bound by any particular explanation of the fluxing conduct of the halogen compound.

Organic halides of all four halogen elements can be used, though not all with equal success on all metals. Among compound-metal combinations we have tried and found successful may be listed amyl chloride, allyl chloride, 1-chlor propene, and butyryl fluoride on stainless steel welding; propyl bromide, ethyl iodide and butyryl fluoride on brass and copper brazing.

Other compounds which operate with success by the method of our invention are isocrotyl chloride, butyl chloride, benzoltrifluoride; less effective, but still workable, are dichlorethylene, methylene, chloride, trichlorethylene, chloroform, and carbon tetrachloride. In general, the monohalide derivatives are more practical than the polyhalogenated compounds. This may be due to the fact that the increase in halogenation doubtlessly acts to cool the flame to too great an extent and thereby interferes with the heating requirements of the torch, though, basically, the fluxing character of the flame gas remains unchanged.

For purely practical reasons, compounds which hydrolyze very easily are best avoided, unless the torch gases are well dehydrated. The acyl halides, such as acetyl chloride, are in this category. This factor is equally of importance when the halide is used in combination with a volatile borate (as will be discussed below), for such borates are best obtained in azeotropic combination with their alcohols, and alcohols react with acyl halides. The acyl fluorides are an exception to this last rule, for they dissolve in alcohols without reaction, and can therefore readily be used in conjunction with the borates-alcohols azeotropes.

There are a number of utilizations where the fluxing powers of the volatile alkyl borates have proven unsatisfactory, but where the addition of a relatively small proportion of a volatile halogen compound of the type already discussed will yield a fully-operable gaseous flux torch operation. As an example, we may cite the methyl borate-methyl alcohol combination. In silver-soldering on brass and copper, in the welding of silver, in the welding of sand-cast aluminum, and in the welding of stellite, methyl borate, even when diluted with methyl alcohol, or even when treated as indicated in our co-pending application, Serial No. 220,560, has proven inadequate. If, however, in line with our invention, a small quantity of a halide is added to the borate or borate-alcohol mixture, an operable flux results in all the cases cited. We prefer, for this purpose, to use vaporizable borate fluxes of the type discussed in our co-pending application, in which borate-alcohol mixtures are further diluted by solvents of low oxygen content, and to add vaporizable halides between the limits of 5% and 50% of the total. As one particular example, we may cite a liquid vaporizable flux of the composition

| | Per cent |
|---|---|
| Methyl borate | 28.2 |
| Methanol | 10.6 |
| Amyl chloride | 12.0 |
| Acetone | 49.2 |

This has proven satisfactory, in the hands of ordinarily skilled operators, for the welding of cast aluminum, the welding of stellite, the silver-soldering of brass, copper and silver, as well as for many of the utilizations already indicated as satisfactory for the pure halide compounds themselves.

It is quite obvious that, for the purpose of our invention, the halide compound need not be pure; indeed, various mixtures of chlorides or other halides can be used. Thus, we have found the mixed amyl chlorides as commercially obtainable, fully as satisfactory technically, and, being more economical in cost, commercially preferable to pure n-amyl chloride.

We wish to differentiate our invention sharply from others which have used halogenated organic compounds in the solid state, usually merely as carriers for other fluxing agents. Thus British Patent 413,141 suggests the use of inorganic chemicals with a vehicle of chlordiphenyl and/or paradichlorbenzene. Such organic halides do not lend themselves to entrainment by gas to be delivered to a torch, for they are not readily volatile; the chlordiphenyls boil between 273° C. and 291° C., while paradichlorbenzene boils at 173° C. For the purpose of our invention, no compound can be considered as volatile if its boiling point, under normal pressure, is in excess of 150° C., and our use of the term "volatile" is to be so understood. A further differentiation between the old art and our invention lies in the fact that our invention requires the halogen derivative to be in the liquid state at ordinary temperatures; in the past, the halogen derivatives used have been either in the solid state or else dissolved in an inert solvent which vaporized away on heating, leaving the compound in the solid state.

Though, for obvious reasons, we prefer the use of organic halogen derivatives, our invention need not be limited to the organic field. The inorganic halides can also be used in the manner indicated. For example, stannic chloride, a typical inorganic volatile halide, can be used in a gas-fluxing apparatus, preferably on the oxygen delivery side. For lead-base soldering on brass or copper, for example, such stannic chloride has proven excellent.

Another inorganic chloride which can be used, despite its relatively high volatility requiring external cooling to prevent too much vaporization, is boron trichloride. This halide is of value where both boron and chlorine are desired as vaporizable fluxes.

It will be obvious to those skilled in the art that our invention need not be limited to gas welding or brazing, wherein gas such as acetylene, methane, or hydrogen, is burned together with oxygen or air. In electric arc welding, as well, the vaporizable flux of our invention can be used by conducting a flow of the halide, with or without borates and related compounds, to the zone of the arc, through an auxiliary pipe, using any appropriately inert gas; hydrogen, acetylene, or any of the gases which, by burning in the zone, do not rob heat from the arc, are excellent inert gases for this purpose. Where, therefore, our claims speak of a "torch," this term is to be understood as including electric arc as well as oxidation torches, and "gas to be delivered to a torch" is to be understood as representing, equally, combustion gases necessary for a combustion torch operation, like hydrogen, acetylene, producer gas, methane, oxygen, or air, or an inert gas used merely as a conveying medium to a torch deriving its heat from other sources. In addition to the electric arc torch already mentioned, we may cite, as a further example, the resistance torch described in copending application of Charles A. Medsker and Menahem Merlub-Sobel, Serial No. 228,368, filed September 3, 1938. Our invention is equally applicable with such resistance torches.

This application is a continuation of our copending application, Serial No. 228,398, filed September 3, 1938.

Other modes of applying the principle of our invention may be employed instead of the one explained, change being made as regards the means herein disclosed, provided the means stated by any of the following claims or the equivalent of such stated means be employed.

We therefore particularly point out and distinctly claim as our invention:

1. A liquid for entrainment by gas to be delivered to a torch containing compounds selected from the group of volatile halides and compounds selected from the group of volatile boron compounds.

2. A liquid for entrainment by gas to be delivered to a torch containing compounds selected from the group of volatile organic halides and compounds selected from the group of volatile organic boron compounds.

3. A liquid for entrainment by gas to be delivered to a torch containing compounds selected from the group of volatile organic halides and compounds selected from the group of volatile organic borates.

4. A liquid for entrainment by gas to be delivered to a torch containing compounds selected from the group of volatile organic chlorides and compounds selected from the group of volatile organic borates.

5. A liquid for entrainment by gas to be delivered to a torch containing compounds selected from the group of halides and compounds selected from the group of boron compounds, all of said compounds having a boiling point of not in excess of 150° C.

6. A liquid for entrainment by gas to be delivered to a torch containing compounds selected from the group of organic halides and compounds selected from the group of boron compounds, all of said compounds having a boiling point of not in excess of 150° C.

7. A combustible gas adapted to be delivered to a torch and having entrained therein in amounts sufficient to act as a fluxing agent vaporized compounds selected from the group of organic halides having a boiling point, under normal pressure, not in excess of 150° C.

8. A combustible gas adapted to be delivered to a torch and having entrained therein a vaporized flux containing from about 5% to about 50% of compounds selected from a group of volatile halides.

9. A combustible gas adapted to be delivered to a torch and having entrained therein a vaporized flux containing from about 5% to about 50% of compounds selected from a group of volatile organic halides.

10. A combustible gas adapted to be delivered to a torch and having entrained therein a vaporized flux containing from about 5% to about 50% of compounds selected from the group of volatile chlorides.

11. A combustible gas adapted to be delivered to a torch and having entrained therein a vaporized flux containing from about 5% to about 50% of compounds selected from a group of halides having a boiling point, under normal pressure, not in excess of 150° C.

12. A combustible gas adapted to be delivered to a torch and having entrained therein a vaporized flux containing from about 5% to about 50% of compounds selected from a group of organic halides having a boiling point, under normal pressure, not in excess of 150° C.

13. A gas adapted to be delivered to a torch and having entrained therein a vaporized flux containing from about 5% to about 50% of compounds selected from a group of volatile halides.

JEROME MILTON BIALOSKY.
MENAHEM MERLUB-SOBEL.